United States Patent [19]

Hagiwara et al.

[11] Patent Number: 4,673,848

[45] Date of Patent: Jun. 16, 1987

[54] CONTROL SYSTEM FOR AN AUTOMATIC DOOR

[75] Inventors: Isao Hagiwara; Yukio Yoshida, both of Namerikawa, Japan

[73] Assignee: Yoshida Kogyo K. K., Tokyo, Japan

[21] Appl. No.: 804,833

[22] Filed: Dec. 5, 1985

[30] Foreign Application Priority Data

Dec. 29, 1984 [JP] Japan ............................. 59-200206

[51] Int. Cl.[4] ............................................ H02P 1/18

[52] U.S. Cl. .................................. 318/266; 318/254; 318/466; 318/468

[58] Field of Search ............... 318/138, 254, 256, 264, 318/265, 266, 282, 286, 439, 461, 466, 467, 468, 470

[56] References Cited

U.S. PATENT DOCUMENTS 4,234,833 11/1980 Barrett ........................... 318/468 X
4,429,264 1/1984 Richmond ...................... 318/266 X
4,529,920 7/1985 Yoshida et al. ..................... 318/466
4,546,293 10/1985 Peterson et al. ............... 318/439 X
4,564,792 1/1986 Fukushi ............................. 318/254
4,583,028 4/1986 Angersbach et al. .............. 318/254

FOREIGN PATENT DOCUMENTS 56-71482 6/1981 Japan ................................. 318/470
59-90114 5/1984 Japan ................................. 318/466

*Primary Examiner*—William M. Shoop, Jr.
*Assistant Examiner*—Bentsu Ro
*Attorney, Agent, or Firm*—Hill, Van Santen, Steadman & Simpson

[57] ABSTRACT

As a driving power source for an automatic door, a brushless D.C. motor is employed, and the position and the speed of a door member are determined by making use of detection pulses issued from magnetic pole position detectors which are associated with the brushless D.C. motor without providing any additional detector means separately. On the basis of the current position and the current speed of the door as determined from the detection pulses and of a programmed sequence of opening and closing operations for the door as stored in a control system, the opening and closing movements of the door member are controlled.

6 Claims, 2 Drawing Figures

CONTROL SYSTEM FOR AN AUTOMATIC DOOR

BACKGROUND OF THE INVENTION

1. Field of the Invention

The present invention relates to a control system for controlling operation of an automatic door.

2. Description of the Prior Art

Heretofore, as a control system for an automatic door, there have been known various systems such as a control system including limit switches for detecting the position of a door, a control system in which a rotation detector is provided on a rotary shaft of a drive motor or another rotary shaft and numerical control of the drive motor is effected on the basis of the detected rotational data, a control system in which teeth on a timing belt for coupling a drive motor to a door are detected and counted and numerical control of the drive motor is effected on the basis of the counted data, or the like.

However, in these known control systems in the prior art, it was necessitated to provide any type of door position detector means separately from drive means for a door. Hence, the number of component parts of the system could not be reduced, and so, it was difficult to achieve simplification of the construction and reduction of manufacturing costs.

SUMMARY OF THE INVENTION

It is a principal object of the present invention to provide a control system for an automatic door that is free from the above-described shortcoming in the prior art.

A more specific object of the present invention is to provide a control system for an automatic door in which there is no need to provide door position detector means separately from drive means for the door and hence reduction of manufacturing costs can be achieved.

The improvements in the control system for an automatic door according to the present invention exist in that a brushless D.C. Motor, referred to herein as a D.C. brushless motor, is employed as a drive motor for a door, and magnetic pole position detection signals generated by a magnetic pole position detector inherently provided within a D.C. brushless motor circuit are utilized for detecting the door position in a position control circuit and for detecting the speed of movement of the door in a speed control circuit.

According to one feature of the present invention, there is provided a control system for an automatic door which comprises a D.C. brushless motor coupled to a door member via speed reduction means to transmit driving power to the door member and adapted to deliver magnetic pole position detection pulses. A position control circuit is included responsive to the magnetic pole position detection pulses delivered from the D.C. brushless motor for determining the position of the door member and thereby generating a speed command signal indicating the direction and magnitude of the speed of the door member. Also included is a speed control circuit responsive to the magnetic pole position detection pulses and the speed command signal which applies a drive control signal to the D.C. brushless motor so that the motor is driven at such rotational speed that the door member is moved at the speed indicated by the speed command signal.

The above-mentioned and other features and objects of the present invention will become more apparent by reference to the following description of a preferred embodiment of the invention taken in conjunction with accompanying drawings.

DESCRIPTION OF THE PREFERRED EMBODIMENT

In the following, the present invention will be described in greater detail in connection to one preferred embodiment of the invention.

Figure 1:
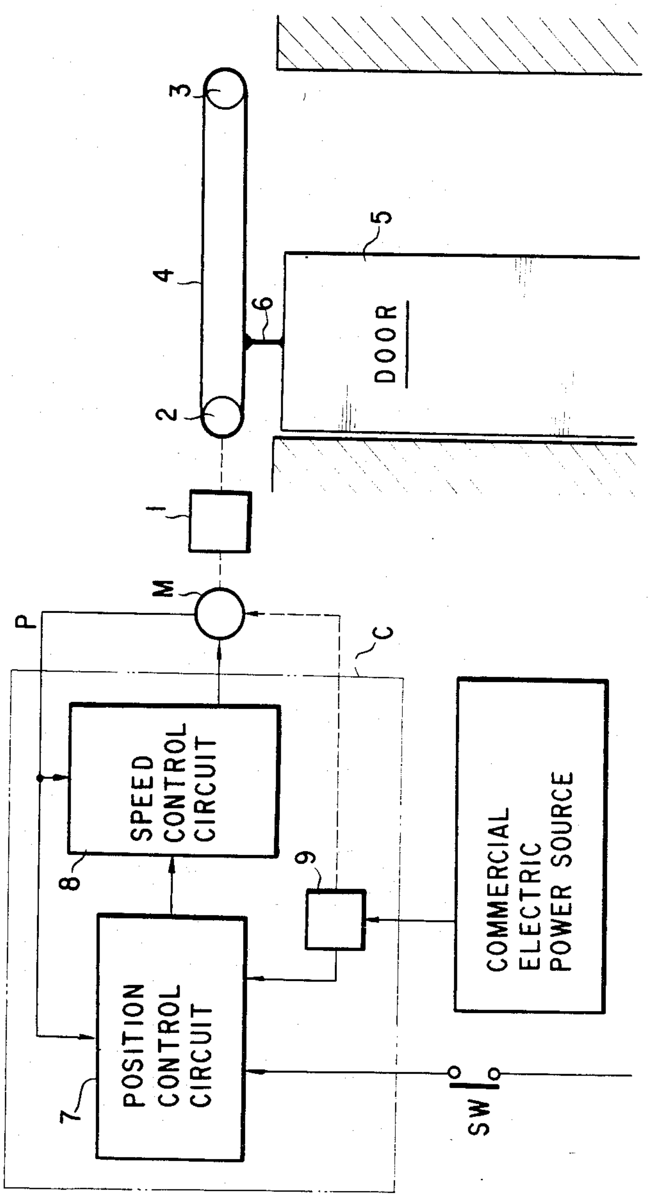
FIG. 1 is a general system diagram showing one preferred embodiment of the present invention.

Referring now to FIG. 1, a D.C. brushless motor M is coupled to a driving pulley 2 via a reduction gear 1, a door drive belt 4 is wrapped around the driving pulley 2 and a driven pulley 3, and a door 5 is connected to the belt 4 via a connecting member 6 so that the door 5 can be moved in the opening or closing direction by rotating the D.C. brushless motor M in the normal or reverse direction, respectively.

Figure 2:
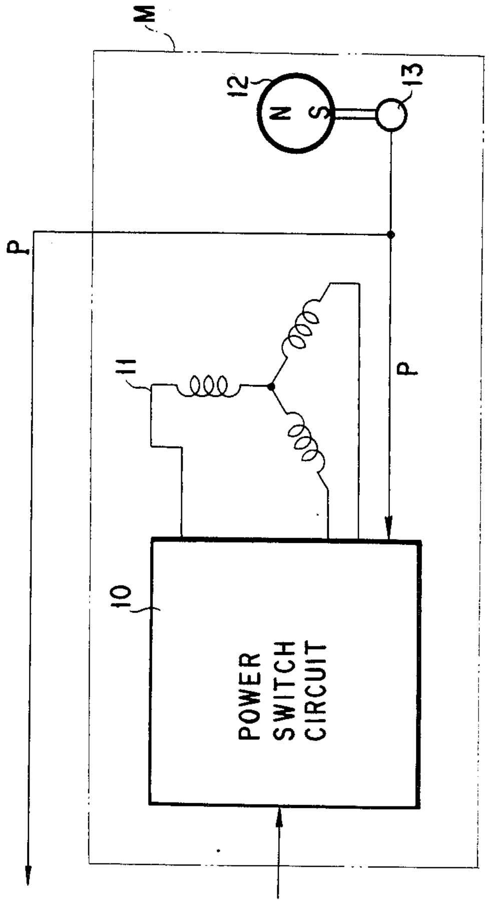
FIG. 2 is a more detailed partial circuit diagram showing the construction of a D.C. brushless motor contained in the control system shown in FIG. 1.

In this D.C. brushless motor M, as shown in FIG. 2, generally armature windings 11 form a stator and a field magnet 12 forms a rotor. In addition, three magnetic pole position detectors 13 each constructed of a Hall effect element, a magnetic reluctance element or a photoelectric element are disposed on the stator at an angular interval of 120° (only one magnetic pole position detector 13 is illustrated in FIG. 2), so that three pulse trains having their phases shifted by 120° from one another are delivered from these magnetic pole position detectors 13 in response to rotation of the field magnet 12 forming the rotor. In a control circuit section enclosed by a chain line frame C, the angular position and rotational speed of the field magnet 12 forming a rotor are determined on the basis of the magnetic pole position detection pulses P consisting of these three pulse trains, and a drive control signal is applied to the D.C. brushless motor M on the basis of the position and speed data. In the D.C. brushless motor M, a power switch circuit 10 associated therewith (See FIG. 2) switches D.C. drive currents fed to the respective armature windings 11 in accordance with the drive control signal to generate the necessary drive torque.

The control circuit section C comprises a position control circuit 7, a speed control circuit 8 and a D.C. power supply circuit 9 which can be switched on and off externally of the control circuit section C. The magnetic pole position detection pulses P delivered from the magnetic pole position detectors 13 in the D.C. brushless motor M are input to the position control circuit 7 and the speed control circuit 8.

The position control circuit 7 has its power supplied from the D.C. power supply circuit 9, and is connected to an access sensor switch SW such as a door mat switch, an infrared sensor, a capacitive sensor, etc. which senses the presence of a human body or other object at an automatic door and issues an actuation signal for the position control circuit 7. This position control circuit 7 determines the direction of rotation of the motor M on the basis of the phase relations among the three pulse trains delivered from the respective magnetic pole position detectors 13, and also determines the position of the door 5 by counting up or counting down the pulses depending upon the direction of rotation (starting from a reference position of the door 5). It is to be noted that the pulses forming the three pulse trains are generated for every ⅓ revolutions or 1/6 revolutions of the rotor depending upon whether pulses of one polarity or pulses of both polarities are taken into consideration.

Within the position control circuit 7 is stored a program consisting of a predetermined sequence of operations for opening and closing the door 5 in response to the actuation signal sent from the access sensor switch SW. Hence, after the access sensor switch SW has sensed presence of an object at the automatic door, the position control circuit 7 issues a speed command signal indicating the direction and magnitude of the desired speed of the door 5 on the basis of the stored sequence program and the determined current position of the door 5, and this speed command signal is applied to the speed control circuit 8.

The speed control circuit 8 calculates and determines the speed of the door 5 on the basis of the magnetic pole position detection pulses P issued from the magnetic pole position detectors 13 in the D.C. brushless motor M, and as a result of comparison between the desired direction and magnitude of the speed of the door 5 indicated by the speed command signal applied from the position control circuit 7 and the current direction and magnitude of the speed of the door 5, it determines the necessary acceleration of the D.C. brushless motor M and issues a drive control signal having a polarity and a magnitude corresponding to the direction and magnitude of the necessary acceleration, which is applied to the D.C. brushless motor M so that the motor may be driven at such rotational speed that the door 5 can be moved at the desired speed indicated by the speed command signal.

In the control system for an automatic door having the above-described construction, when an object such as a human body comes close to the automatic door, the access sensor switch SW is operated and an actuation signal is applied to the position control circuit 7 in the control circuit section C. In response to the actuation signal, the position control circuit 7 generates a speed command signal on the basis of a stored program of the predetermined sequence of operations and the current position of the door 5 on the basis of the magnetic pole detection pulses P, and applies the speed command signal to the speed control circuit 8, which in turn applies a drive control signal to the D.C. brushless motor M to open and close the door 5 according to the predetermined sequence of operations.

During the movement of the door 5, the pulses delivered from the magnetic pole position detectors 13 in the D.C. brushless motor M are applied to the position control circuit 7 as well as to the speed control circuit 8 for use in determining the current position and the current speed of the door 5.

In addition, owing to the employment of the D.C. brushless motor, the buzz noise generated by an A.C. motor in the automatic door in the prior art can be eliminated, and thereby noises generated upon opening and closing the automatic door can be reduced. Moreover, since control of rotational speed and torque of a D.C. brushless motor is easily achieved, controllability of the opening/closing speed of the automatic door is excellent. In the case of employing an AC/DC converter as the D.C. power supply circuit 9, even in an area of a foreign country where the A.C. voltage of the commercial power line is different from that in Japan, the control system according to the present invention can be adapted to the different A.C. voltage in a relatively simple manner only by modifying the circuit of the AC/DC converter.

The principal advantage of the present invention resides in that owing to the use of a D.C. brushless motor as a drive source, the detection pulses issued from the magnetic pole position detectors which is inherently associated with the motor for controlling rotation of the motor, can be utilized for determining the position of the door, hence there is no need to provide a position detector for the door separately from the drive motor, thus the number of component parts are reduced, and thereby reduction of manufacturing costs are realized.

While the principle of the present invention has been described above in connection to one preferred embodiemnt of the invention, it is intended that all matter contained in the above description and illustrated in the accompanying drawing shall be interpreted to be illustrative and not as a limitation to the scope of the invention.

What is claimed is:

1. A control system for an automatic door comprising:

- a brushless D.C. motor having a stator armature encircling a rotatably mounted magnetic field rotor defining magnetic poles and coupled to a door member;
- speed reduction means for transmitting driving power from said brushless D.C. motor to said door member;
- means for delivering magnetic pole position detection pulses from said brushless D.C. motor as said magnetic field rotor rotates;
- a position control circuit responsive to said magnetic pole position detection pulses delivered from said delivering means for determining the position of said door member and thereby generating a speed command signal indicating the direction and magnitude of the speed of said door member; and
- a speed control circuit responsive to said magnetic pole position detection pulses and said speed command signal connected to apply a drive control signal to said brushless D.C. motor so that said brushless D.C. motor is driven at such rotational speed that said door member is moved at the speed indicated by said speed command signal.

2. A control system for an automatic door as claimed in claim 1, in which the polarity and magnitude of the drive control signal applied from said speed control circuit to said brushless D.C. motor are determined depending upon said speed command signal and said magnetic pole position detection pulses.

3. A control system for an automatic door as claimed in claim 1, further comprising: an access sensor switch connected to actuate said position control circuit when said access sensor switch senses an object at said automatic door.

4. A control system for opening and closing an automatic door, comprising:

- a brushless D.C. motor having a rotatable magnetic rotor within a stator armature, said magnetic rotor being linked to a motor output;

a plurality of rotor position sensors connected to produce a sequence of magnetic pole position detection pulses as said rotor rotates;

a speed reduction means for connecting said motor output to the automatic door to open and respectively close said door in response to operation of said motor;

means for automatically selectably triggering an actuation signal to initiate door operation;

a position control circuit connected to receive said magnetic pole position detection pulses from said plurality of rotor position sensors to determine the rotation of the motor and thereby the position of the automatic door, said position control circuit generating a speed command signal in response to the actuation signal; and a speed control circuit connected to receive said magnetic pole position detection pulses and to receive said speed command signal from said position control circuit to determine the acceleration of said motor and thereby generate a drive control signal for transmission to said motor;

whereby said magnetic pole position detection pulses determine the position and direction of movement of said door.

5. A control system as claimed in claim 4, wherein three of said rotor position sensors are provided.

6. A control system as claimed in claim 4, wherein said position control circuit includes means for storing a predetermined sequence of program steps to control opening and alternately closing of said automatic door.

* * * * *